US012378739B2

(12) United States Patent
Wright et al.

(10) Patent No.: US 12,378,739 B2
(45) Date of Patent: Aug. 5, 2025

(54) RAIL TRACK CLEANER VEHICLE

(71) Applicants: Steven J. Wright, SeaTac, WA (US); Krista J. Wright, SeaTac, WA (US)

(72) Inventors: Steven J. Wright, SeaTac, WA (US); Krista J. Wright, SeaTac, WA (US)

( * ) Notice: Subject to any disclaimer, the term of this patent is extended or adjusted under 35 U.S.C. 154(b) by 885 days.

(21) Appl. No.: 17/568,741

(22) Filed: Jan. 5, 2022

(65) Prior Publication Data

US 2023/0212833 A1 Jul. 6, 2023

(51) Int. Cl.
*E01H 8/10* (2006.01)
*B08B 15/02* (2006.01)

(52) U.S. Cl.
CPC ............. *E01H 8/105* (2013.01); *B08B 15/02* (2013.01); *E01H 8/10* (2013.01)

(58) Field of Classification Search
CPC .. E01H 8/00; E01H 8/10; E01H 8/105; E01H 8/12; E01H 8/125; B08B 15/02
See application file for complete search history.

(56) References Cited

U.S. PATENT DOCUMENTS 705,585 A * 7/1902 Hope ........................ A47L 5/28 15/354
1,195,027 A * 8/1916 Jones .................. A01M 7/0053 239/173
2,597,719 A * 5/1952 Foster ...................... E01H 8/105 15/340.1
3,103,897 A * 9/1963 Bonanno ................... E01H 8/10 446/447
4,741,072 A * 5/1988 Wilkerson ................ E01H 8/00 15/348
5,381,958 A * 1/1995 Koblmuller ............. E01H 11/00 239/174
6,148,732 A * 11/2000 Conway .................. E01H 8/105 15/55
9,308,921 B2 * 4/2016 Worden ................ B61C 15/107
9,631,332 B2 * 4/2017 Shubs, Jr. ................. E01H 8/04
9,718,480 B2 * 8/2017 Worden ................ B61C 15/107
2022/0228335 A1 * 7/2022 Scholl ................... B61L 99/002

FOREIGN PATENT DOCUMENTS

AT 363983 B * 9/1981
CN 108252259 A * 7/2018 ............. E01H 1/005

* cited by examiner

*Primary Examiner* — S. Joseph Morano
*Assistant Examiner* — Cheng Lin
(74) *Attorney, Agent, or Firm* — Alloy Patent Law; Walker Griffin Weitzel

(57) ABSTRACT

Presented is a rail track cleaner vehicle configured for cleaning rail area. The rail track cleaner vehicle includes a wheel assembly, a main frame, a liquid sprayer assembly, an air blower assembly, a vacuum assembly and an electric motor assembly. The rail track cleaner vehicle comprises a plurality of optical camera to capture real time image of the rail area. The rail track cleaner vehicle efficiently and effectively clean the rail area and enables a remote personnel to inspect the cleaning process. The rail track cleaner vehicle substantially reduces manual labor and effort to clean the rail area.

11 Claims, 12 Drawing Sheets

RAIL TRACK CLEANER VEHICLE

TECHNICAL FIELD OF INVENTION

The present invention generally relates to rail track cleaners and more particularly, the present invention pertains to a rail track cleaner vehicle that effectively and efficiently cleans the rail area across various rail platforms.

BACKGROUND

Trains are generally considered a safe and a convenient transportation by various travelers across the world. Generally, trains can be broadly categorized as electric trains, diesel trains or electro-diesel trains depending on the type of power source used to propel the train. Generally, modern trains operate electrically with the engine receiving power through a railway electrification system which can include but not limited to: overhead lines, live rails and so on.

Rail tracks enable movement of trains as they provide a running surface for the wheels of train. Due to various factors such as but not limited to; wear and tear, weather effect, prolonged use, train toilets, public use, potential fluid leakage from trains and so on, the train tracks becomes dirty and could produce foul smell which could be unpleasant from a traveler's perspective.

Considering an extensive large network of the rail tracks, only rail tracks of railway platform area is cleaned to save time and effort. The rail tracks of the railway platform area is cleaned manually by labor using hand tools such as hand brushes, scrubber, water buckets, water jets, washing cloths and so on. Manual cleaning of rail tracks could be potentially dangerous as generally, rail tracks have energized rails. Further, manual cleaning of rail tracks takes considerable time and effort and often requires re-routing and/or stopping the flow of incoming trains which is inconvenient for passengers travelling in the train.

Various devices have been attempted in the prior art to solve the above mentioned problem. For example, U.S. Pat. No. 6,758,145B1 discloses a model railroad track cleaning car having a cleaning element suspended between a pair of wheeled trucks. The cleaning element is an abrasive material that is affixed to the underside of a weighted chassis that is suspended from a pair of articulating arms connected to the respective wheeled trucks. The cleaning material is easily replaced by removing a pair of fasteners from the chassis. A spring tension apparatus is positioned between the articulating arm and the cleaning element chassis to selectively position the cleaning element over the model railroad tracks. A retaining wire is captured in the articulating arm and engages the corresponding truck to turn the articulating arm with the truck, thus positioning the cleaning element over the model railroad tracks even when traversing a curve. A thumb wheel is formed with a notch that receives the articulating arm to lock the thumb wheel into a selected position.

U.S. Pat. No. 8,371,229B1 discloses a track cleaning car that includes a base plate having a top surface, a bottom surface, a front end, and a rear end, a hole centrally disposed in the base plate with a motor suspended over the hole, the motor disposed from a floating plate compressibly mounted over the base plate on a plurality of springs, each of the plurality of springs disposed around each of a plurality of guide rods, the motor engaging a driveshaft to rotate a rotatable disk with a cleaning pad removably attachable thereto, and the track cleaning car having a photomicroprocessor sensible of the motion of the track cleaning car, the photomicroprocessor arresting the motor when sensing the track cleaning car is at rest.

The existing prior art(s) do not provide an effective solution due to its cumbersome design and difficulty in use. Thus, there is a need for a rail track cleaner vehicle that effectively and efficiently cleans the rail area across various rail platforms.

BRIEF SUMMARY

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

It is an object of the present invention to provide a rail track cleaner vehicle that is configured to efficiently and effectively clean the rail area.

It is an object of the present invention to provide a rail track cleaner vehicle that enables remote personnel to inspect the cleaning process.

It is an object of the present invention to provide a rail track cleaner vehicle that substantially reduces manual labor and effort to clean the rail area across various rail platforms.

It is an object of the present invention to provide a rail track cleaner vehicle that is powered by overhead rail lines.

It is an object of the present invention to provide a rail track cleaner vehicle that is powered by electric third rail.

It is an object of the present invention to provide a rail track cleaner vehicle that is battery-powered.

It is an object of the present invention to provide a rail track cleaner vehicle that is easily attachable to a rail vehicle.

Embodiments of the present invention disclose a rail track cleaner vehicle configured for cleaning rail area. The rail track cleaner vehicle comprising: a wheel assembly comprising a pair of front wheels and a pair of rear wheels longitudinally spaced from one another; a main frame connected to wheel assembly wherein the frame element comprises a first frame, a second frame and a third frame; a liquid sprayer assembly positioned on top of the first frame wherein the liquid sprayer assembly comprises a liquid storage tank, a spray pipe and at least one spray nozzle; an air blower assembly positioned on top of the second frame wherein the air blower assembly comprises a compressor, at least one air duct and an air outlet portion; a vacuum assembly positioned on top of the third frame wherein the vacuum assembly comprises a vacuum pump, a trash collector bin and at least one vacuum hose, an electric motor assembly positioned on top of the main frame for propelling the air blower assembly and the vacuum assembly.

In an embodiment, the rail track cleaner vehicle comprises an electric battery for powering the electric motor assembly.

In an embodiment, the rail track cleaner vehicle comprises an overhead current collector to collect power from overhead lines.

In an embodiment, the rail track cleaner vehicle comprises a bottom power collector to collect power from electric third rail.

In an embodiment, the rail track cleaner vehicle comprises a coupling to removably connect the rail track cleaner vehicle with other rail vehicle.

In an embodiment, the rail track cleaner vehicle comprises a wireless communication module for enabling wireless connection to a remote device.

In an embodiment, the rail track cleaner vehicle comprises at least one optical camera.

In an embodiment, the rail track cleaner vehicle comprises a vehicle controller to control various operational parameters of the rail track cleaner vehicle.

In an embodiment, the rail track cleaner vehicle comprises an operator cabin to control various operational parameters of the rail track cleaner vehicle.

In an embodiment, the wheel assembly comprises a wheel adjusting subassembly for adjusting ground clearance of the rail track cleaner vehicle.

In an embodiment, the liquid sprayer assembly comprises a flow control element.

Embodiments of the present invention disclose a method of cleaning rail area comprising the steps of:—spraying a liquid in the rail area, pushing the trash from the rail track to the edge of the platform by using pressurized air; collecting the trash from the edge of the platform in a trash collector bin by using vacuum.

Various objects, features, aspects and advantages of the present invention will become more apparent from the following detailed description of the embodiments of the invention, along with the accompanying drawings in which like numerals represent like components.

BRIEF DESCRIPTION OF THE DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

DETAILED DESCRIPTION

Some embodiments, illustrating its features, will now be discussed in detail. The words “comprising,” “having,” “containing,” and “including,” and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms “a,” “an,” and “the” include plural references unless the context clearly dictates otherwise. Although any methods, and systems similar or equivalent to those described herein can be used in the practice or testing of embodiments, the preferred methods, and systems are now described. The disclosed embodiments are merely exemplary.

The various features and embodiments of a rail track cleaner vehicle of the present invention will now be described in conjunction with the accompanying figures, namely FIGS. 1-11.

Figure 1:
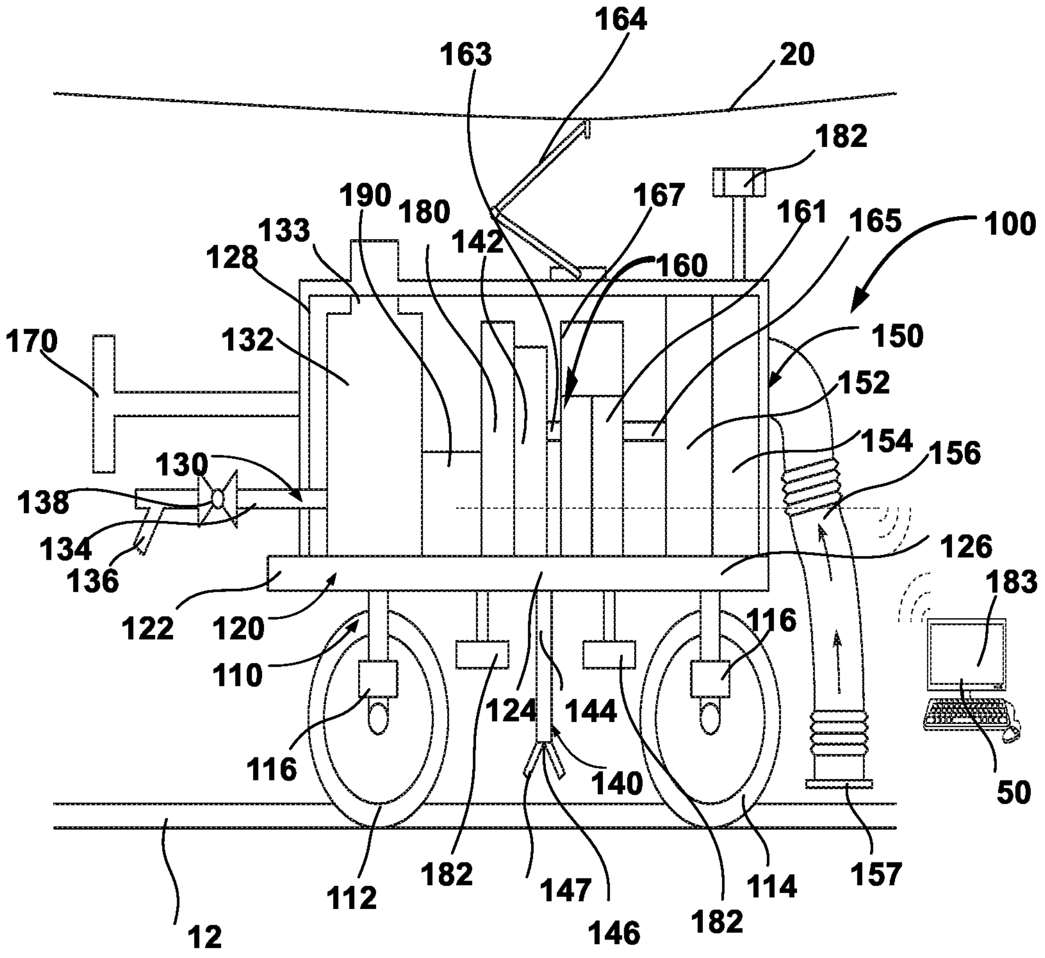
FIG. 1 illustrates a side view of a rail track cleaner vehicle placed on a rail track in a rail area, according to an embodiment of the present invention.
Figure 2:
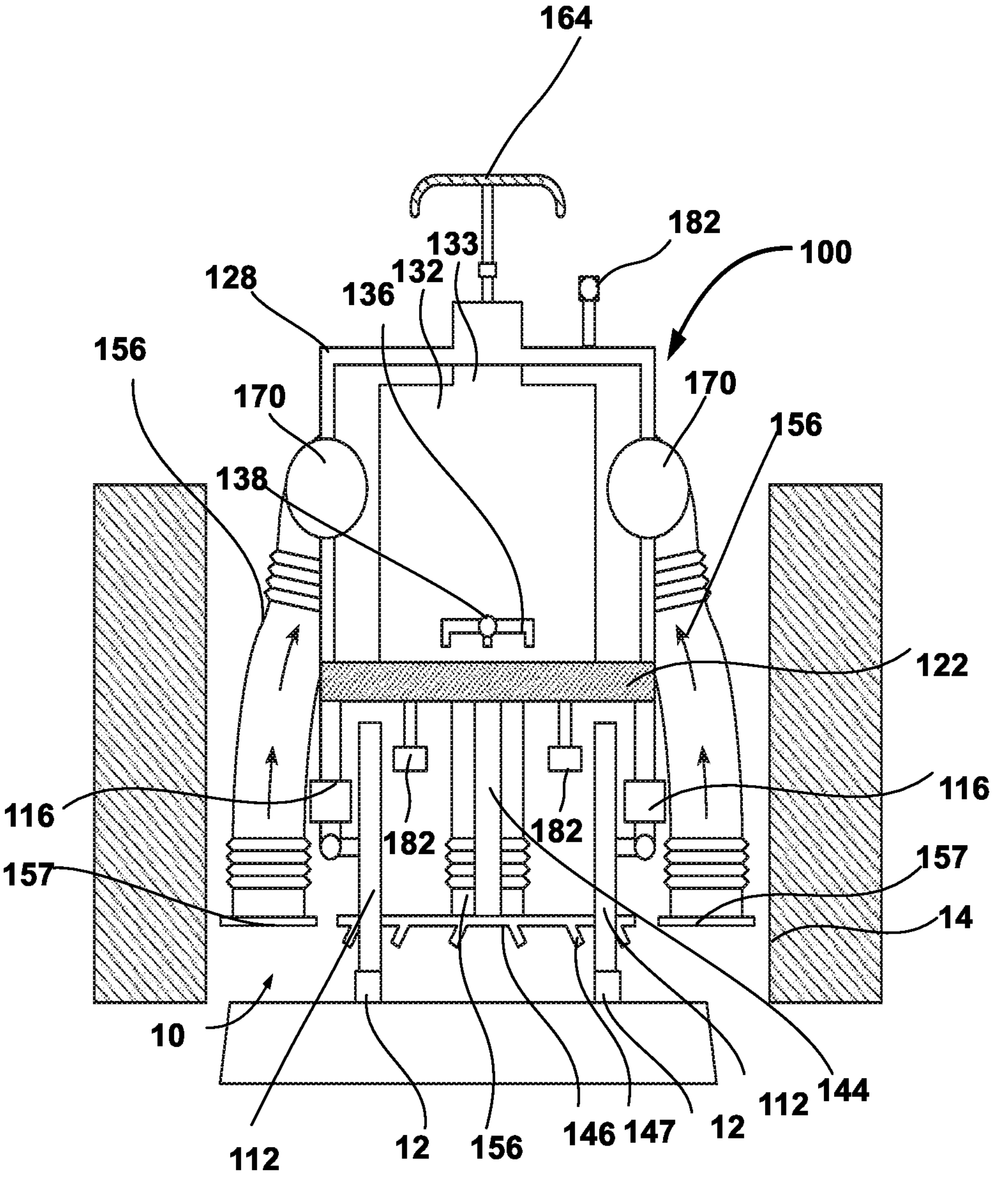
FIG. 2 illustrates a front view of the rail track cleaner vehicle of FIG. 1.
Figure 3:
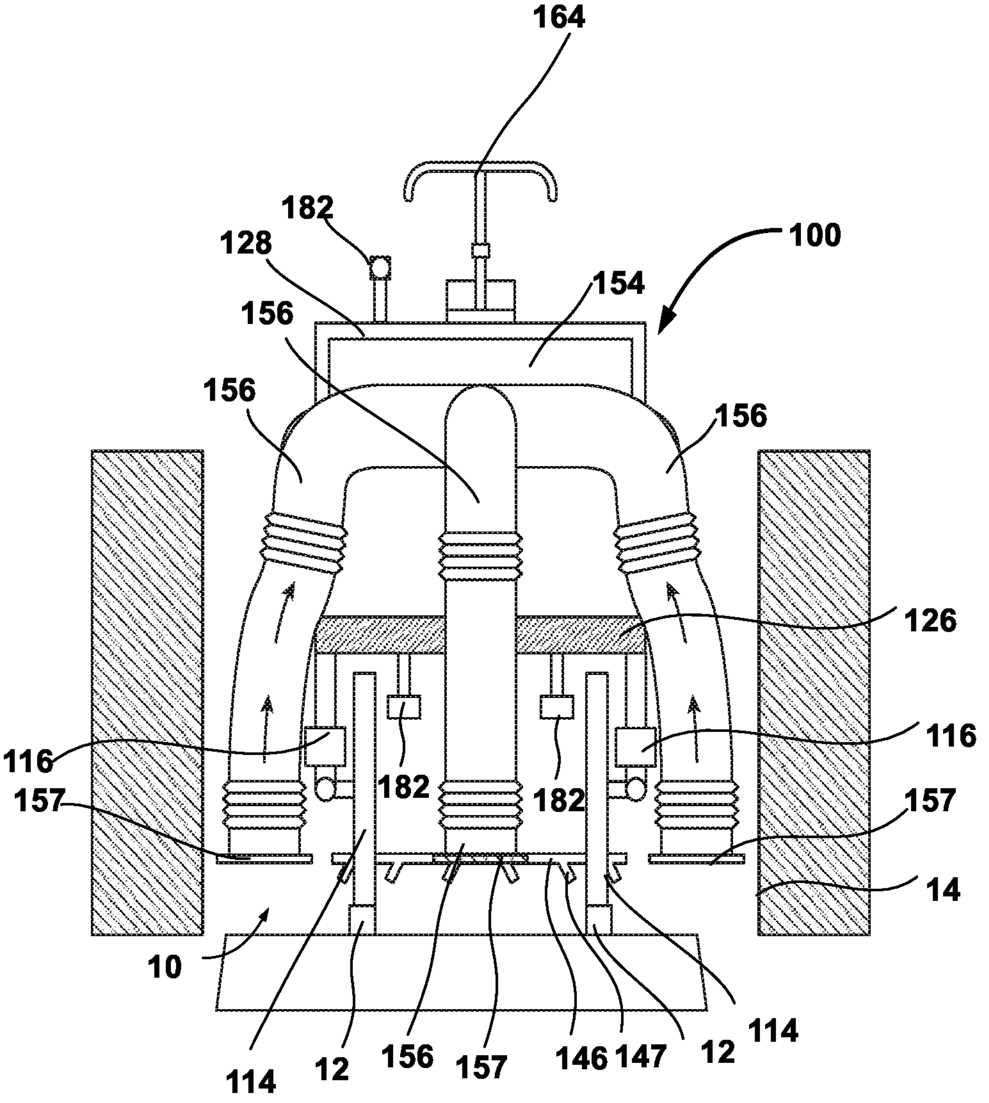
FIG. 3 illustrates a rear view of the rail track cleaner vehicle of FIG. 1.

FIGS. 1-3 illustrates a side view of a rail track cleaner vehicle 100 placed on a rail track 12 in a rail area 10, according to an embodiment of the present invention. The rail track cleaner vehicle 100 is configured for cleaning the rail area 10. The rail track cleaner vehicle 100 comprises a wheel assembly 110, a main frame 120, a liquid sprayer assembly 130, an air blower assembly 140, a vacuum assembly 150 and an electric motor assembly 160 which will be described in greater detail in the description below.

The wheel assembly 110 comprises a pair of front wheels 112 and a pair of rear wheels 114 longitudinally spaced from one another. Each of the front wheels 112 and the rear wheels 114 comprise a wheel adjusting subassembly 116 for adjusting ground clearance of the rail track cleaner vehicle 100. Each of the front wheels 112 and the rear wheels 114 is connected to the main frame 120 through a wheel adjusting subassembly 116. The wheel adjusting subassembly(s) 116 adjusts distance of the main frame 120 from the centre of the front wheels 112 and the rear wheels 114, thereby adjusting the overall height of the rail track cleaner vehicle 100. The wheel adjusting subassembly 116 could include but not limited to: hydraulic screw, air damper, air piston, hydraulic lift, shock absorber, height adjustable suspension and so on. In an embodiment, the wheel adjusting subassembly 116 is electrically connected to a vehicle controller 180 which will be described in greater detail in the below description. The wheel assembly 110 enables the rail track cleaner vehicle 100 to propel on the rail track 12. In an embodiment (not shown in figures), the wheel assembly 110 is rotationally coupled to electric motor assembly 160 to propel the rail track cleaner vehicle 100 on the rail track 12.

In another embodiment, the wheel assembly 110 could be rotationally connected to other power source (not shown in figures) of the rail track cleaner vehicle 100 such as but not limited to: diesel engine, petrol engine, hybrid engine, gas turbine and so on.

The main frame 120 is connected to wheel assembly 110 wherein the main frame 120 comprises a first frame 122, a second frame 124 and a third frame 126. The main frame 120 is divided into the first frame 122, the second frame 124 and the third frame 126. The second frame 124 is positioned between the first frame 122 and the third frame 126. The main frame 120 is capable of supporting various loads of the rail track cleaner vehicle 100. The main frame 120 is made up of a substantially rigid material such as but not limited to: steel, aluminum, iron, alloys, high strength carbon fiber and so on. Further, the main frame 120 is connected to a vehicle body frame 128 which defines the overall structure of the rail track cleaner vehicle 100.

The liquid sprayer assembly 130 is positioned on top of the first frame 122 wherein the liquid sprayer assembly 130 comprises a liquid storage tank 132, a spray pipe 134 and a plurality of spray nozzles 136. The spray pipe 134 is connected to the outlet of the liquid storage tank 132 and the plurality of spray nozzles 136 are positioned downstream of the spray pipe 134. The liquid storage tank 132 comprises a removable lid 133 to permit filling of the liquid in the liquid storage tank 132 wherein the liquid could include but not limited to: plain water, soapy water, detergent water and so on. The liquid sprayer assembly 130 comprises a flow control element 138. In an embodiment, the flow control element 138 is a mechanical one way valve manually operated by a human operator. In another embodiment, the flow control element 138 is an electronically controlled valve electrically connected to a vehicle controller 180 which will be described in greater detail in the below description. The liquid sprayed from the liquid sprayer assembly 130 wets the dust particles of trash such that dust particles does not rise up from the rail area during next process i.e. pressurized air blowing on rail track 12.

The air blower assembly 140 is positioned on top of the second frame 124 wherein the air blower assembly 140 comprises a compressor 142, at least one air duct 144 and an air outlet portion 146. The air duct 144 is connected to the outlet of the compressor 142 and the air outlet portion 146 is positioned downstream of the air duct 144. In an embodiment, the compressor 142 is a two stage compressor. The air outlet portion 146 facilitates passage of pressurized air from the compressor 142 through the air duct 144(*s*) to the rail track 12. The air outlet portion 146 comprises a plurality of air distribution outlets 147. The pressurized air from the air distribution outlets 147 pushes the trash from the rail track 12 to the edge of the platform 14.

The vacuum assembly 150 is positioned on top of the third frame 126 wherein the vacuum assembly 150 comprises a vacuum pump 152, a trash collector bin 154 and a plurality of vacuum hoses 156. The trash collector bin 154 is connected to the suction port of the vacuum pump 152 and the vacuum hoses 156 are positioned downstream of the trash collector bin 154. Each vacuum hose 156 has a suction port 157. The vacuum pump 150 causes suction of trash such that the trash from the edge of the platform 14 is pulled due to suction affect through the suction ports 157 of plurality of vacuum hoses 156 in the trash collector bin 154. As shown in FIG. 2 and FIG. 3, three vacuum hoses 156 are shown wherein a vacuum hose 156 is directed to the centre of rail track 12 to collect remaining trash from the centre of rail track 12 and the remaining two vacuum hoses 156 are directed towards the edge of the platform 14. Further, in other embodiments, the number of vacuum hoses could be arbitrary such as but not limited to: one, two, four, five and so on.

In an embodiment, the trash collector bin 154 is removable such that accumulated trash in the trash collector bin 154 can be removed from the rail track cleaner vehicle 100 by removing the trash collector bin 154 from the rail track cleaner vehicle 100. Afterwards, the trash collector bin 154 is emptied out by pouring the trash out from the trash collector bin 154 in a garbage facility. Afterwards, the emptied trash collector bin 154 is re-installed in the rail track cleaner vehicle 100. In another embodiment, the trash collector bin 154 is one time use only such that the trash collector bin 154 is discarded after single use when the trash collector bin 154 is completely full of trash. In another embodiment, the trash collector bin 154 has a trash outlet port 155 (not shown in figures) to facilitate removal of trash such that the trash could be removed from the rail track cleaner vehicle 100 by merely opening the trash outlet port 155 (not shown in figures) without removing the trash collector bin 154 from the rail track cleaner vehicle 100.

The electric motor assembly 160 is positioned on top of the main frame 120 for propelling the air blower assembly 140 and the vacuum assembly 150. The electric motor assembly 160 could include electric drives capable of providing rotational torque to the air blower assembly 140 and the vacuum assembly 150. The electric drives could include but not limited to: DC motors, AC motors, servo motors, stepper motors and so on. The electric motor assembly 160 comprises a variable frequency drive 161 that independently controls rotational speeds of each of the air blower assembly 140 and the vacuum assembly 150. The air blower assembly 140 is rotationally connected to the variable frequency drive 161 by a shaft 163. The vacuum assembly 150 is rotationally connected to the variable frequency drive 161 by a shaft 165. The variable frequency drive 161 is electrically connected to the controller 180 which will be described in greater detail in the below description. In an embodiment (not shown in figures), the electric motor assembly 160 is rotationally coupled to the wheel assembly 110 to propel the rail track cleaner vehicle 100 on the rail track 12.

The Rail track cleaner vehicle 100 comprises a plurality of optical camera 182. The optical camera(s) 182 captures real time image of the rail area 10. In an embodiment, the optical camera(s) 182 is electrically connected to the controller 180 which will be described in greater detail in the below description. The controller 180 directs the image output of the optical camera 182 in a display screen 183. As shown in FIG. 1, an optical camera 182 is positioned in the top of the Rail track cleaner vehicle 100 such that the optical camera 182 is connected to the vehicle body frame 128. Further, a plurality of optical camera 182 is positioned in the underside of the main frame 120 such that the optical camera 182 is connected to the main frame 120.

Further, the rail track cleaner vehicle 100 comprises a vehicle controller 180 which will now be described in detail. The vehicle controller 180 controls various operational parameters of the rail track cleaner vehicle 100. In an exemplary embodiment, the vehicle controller 180 is electrically connected to the flow control element 138, a wheel adjusting subassembly 116, variable frequency drive 161, and the optical camera(s) 182. The vehicle controller 180 instructs/controls the flow control element 138, the wheel adjusting subassembly 116, the variable frequency drive 161, and the optical camera(s) 182. In an embodiment, the vehicle controller 180 is automatically controlled by a preprogrammed logic/algorithm to ensure efficient and effective cleaning of the rail area 10 by the rail track cleaner vehicle 100.

In another embodiment, the vehicle controller 180 autonomously propels the rail track cleaner vehicle 100. The rail track cleaner vehicle 100 could comprise sensors (not shown in figures) such as but not limited to: LIDAR, compasses, odometers, inclinometers, gyroscopes, cameras for triangulation, laser and ultrasound range finders, and infrared technology. The sensors could communicate with the vehicle controller 180 such that the rail track cleaner vehicle 100 is self propelled.

In another embodiment as shown in FIG. 1, the Rail track cleaner vehicle 100 comprises a wireless communication module 190 for enabling wireless connection to a remote device 50. The wireless communication module 190 is electrically connected to the controller 180. Further, a remote device 50 is wirelessly connected to the wireless communication module 190 such that a user can remotely operate a remote device 50 to observe and/or control the controller 180. Thus, a user can remotely inspect the cleaning process by viewing the rail area 10 using optical camera 182 in the display screen 183 of the remote device 50. Further, the remote device 50 could have a software/application that could collect data from the user commands wherein the software/application instructs the controller 180 to control the rail track cleaner vehicle 100. The wireless communication module 190 utilizes a wireless network selected from: RF, infrared, Bluetooth, Radio control, Internet, Wi-Fi, NFC or any other wireless communication method already known in the art. Further, the remote device 50 is selected from: a Smartphone, computer, mobile, handsets, laptop, PDA, wireless transceiver and so on.

In an embodiment, the vehicle controller 180 enables a remote personnel to remotely propel the rail track cleaner vehicle 100. The wireless communication module 190 is electrically connected to the controller 180. Further, a remote device 50 is wirelessly connected to the wireless communication module 190 such that a user can remotely operate a remote device 50 to remotely propel the controller 180.

In another embodiment, the controller 180 includes a manual interface such as buttons, touchpad, switches and so on wherein an operator can manually control the Rail track cleaner vehicle 100 by providing manual input in the controller 180.

The Rail track cleaner vehicle 100 comprises a coupling 170 to removably connect the rail track cleaner vehicle 100 with other rail vehicle 40. The coupling 170 could include but not limited to: link and pin coupling, radial couplers, bell and hook couplers, centre buffer couplers or any other coupling conventionally known in the art. The coupling 170 permits safe carrying of Rail track cleaner vehicle 100 in case of power malfunction in the Rail track cleaner vehicle 100. A rail vehicle 40 such as but not limited to: train engine, Passenger car and so on could be removably coupled to the rail track cleaner vehicle 100 by connecting the coupling 170 of the rail track cleaner vehicle 100 with the rail vehicle 40.

The rail track cleaner vehicle 100 further comprises various conventional parts such as but not limited to: brake system, pneumatic lines, axles, suspension system, warning system and so on typically required to operate a rail vehicle on the rail tracks. In an embodiment (not shown in figures), the electric motor assembly 160 is rotationally coupled to the wheel assembly 110 to propel the rail track cleaner vehicle 100 on the rail track 12.

In another embodiment, the rail track cleaner vehicle 100 could include other power source such as but not limited to: diesel engine, petrol engine, hybrid engine, gas turbine and so on to propel the rail track cleaner vehicle 100 on the rail track 12. The other power source could be rotationally connected to the wheel assembly 110 to propel the rail track cleaner vehicle 100 on the rail track 12.

Referring to FIGS. 1-3, the rail track cleaner vehicle 100 comprises an overhead current collector 164 to collect electrical power from overhead lines 20. The overhead lines 20 could to be connected to an electrical power generation source such as but not limited to: thermal power plant, hydropower plant, steam power plants and so on. The overhead current collector 164 is positioned on the top of the rail track cleaner vehicle 100 such that the rail track cleaner vehicle 100 receives continues electric supply from overhead lines 20 to power the rail track cleaner vehicle 100. As shown in FIGS. 1-3, the overhead current collector 164 is connected to the vehicle body frame 128. In an exemplary embodiment, the overhead current collector 164 supplies electric power received from overhead lines 20 to the electric motor assembly 160. Further, the rail track cleaner vehicle 100 comprises a power distribution unit 167 that facilitates safe electrical route of current from the overhead current collector 164 to the electric motor assembly 160. The power distribution unit 167 controls power fluctuations in the overhead lines 20. The power distribution unit 167 could comprise electric circuitry that could include: a transformer, invertors, rectifiers, resistors, fuses and so on.

As shown in FIGS. 1-3, the overhead current collector 164 is a pantograph collector. Further, in various other embodiments (not shown in figures), the overhead current collector 164 could include but not limited to: bow collector, trolley pole and so on.

Figure 4:
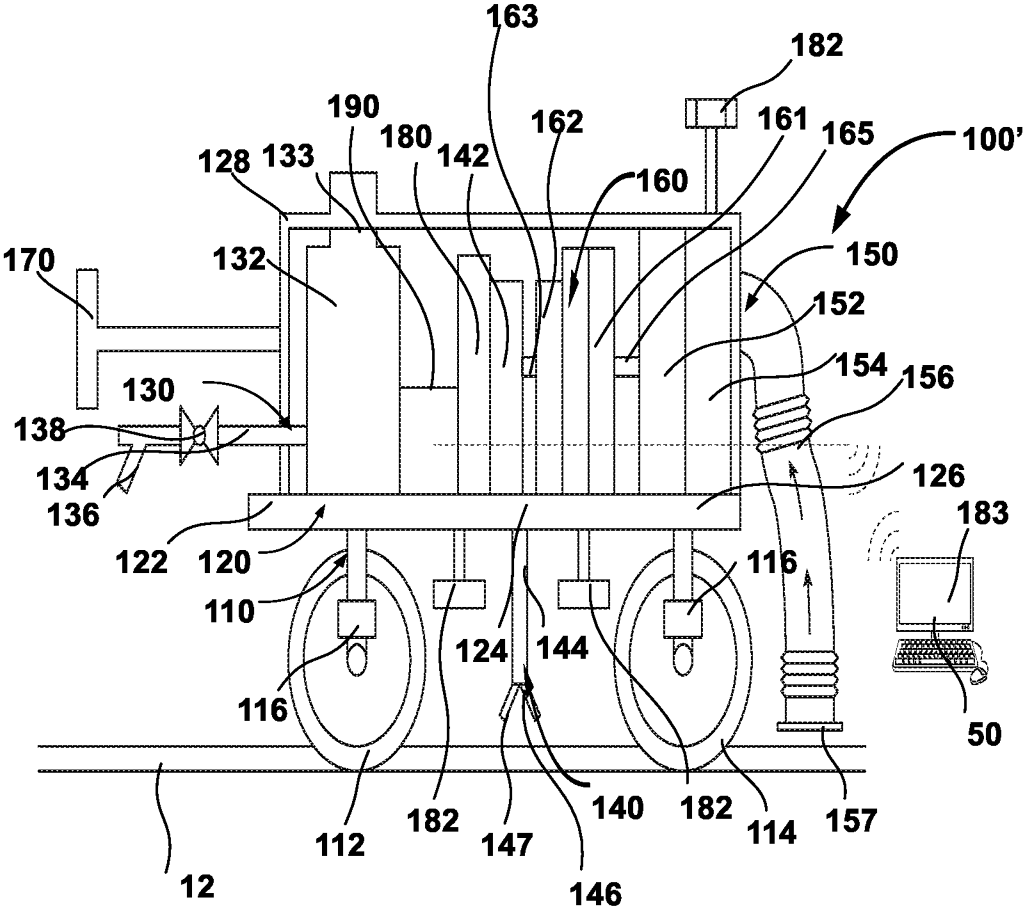
FIG. 4 illustrates a side view of a rail track cleaner vehicle placed on a rail track in a rail area, according to another embodiment of the present invention.
Figure 5:
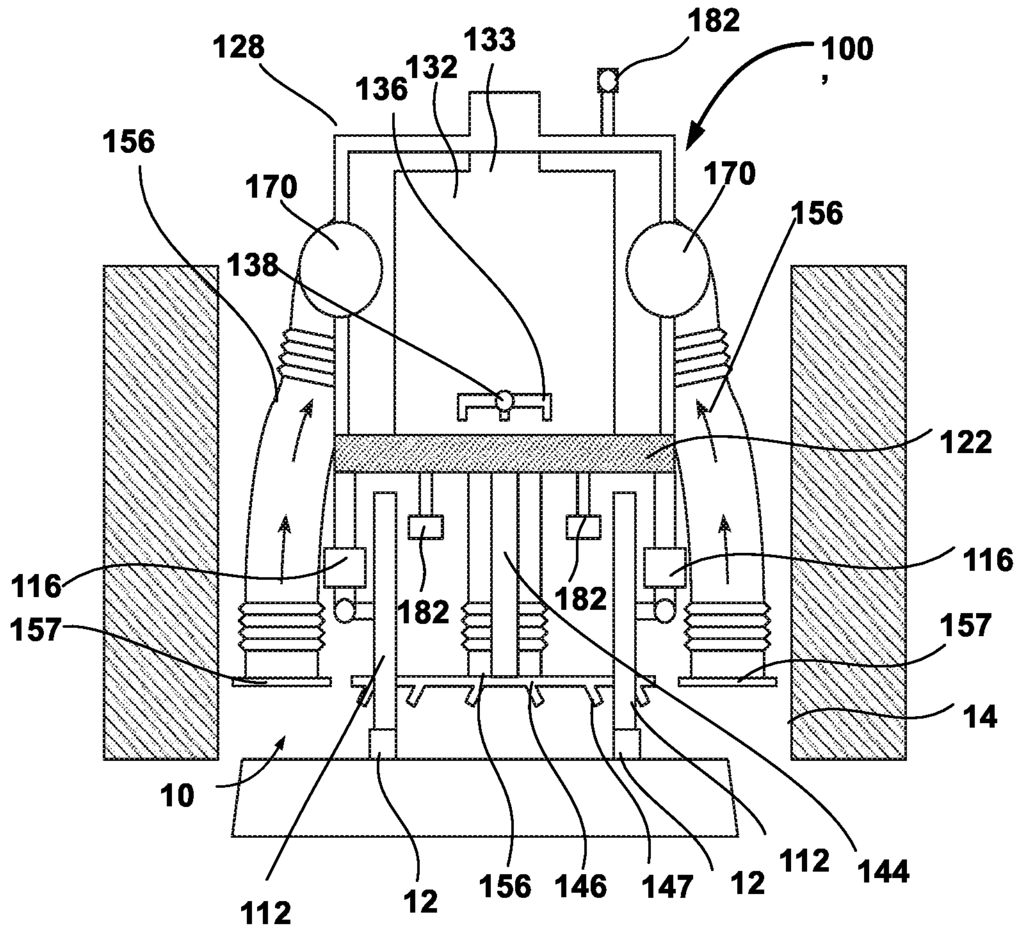
FIG. 5 illustrates a front view of the rail track cleaner vehicle of FIG. 4.
Figure 6:
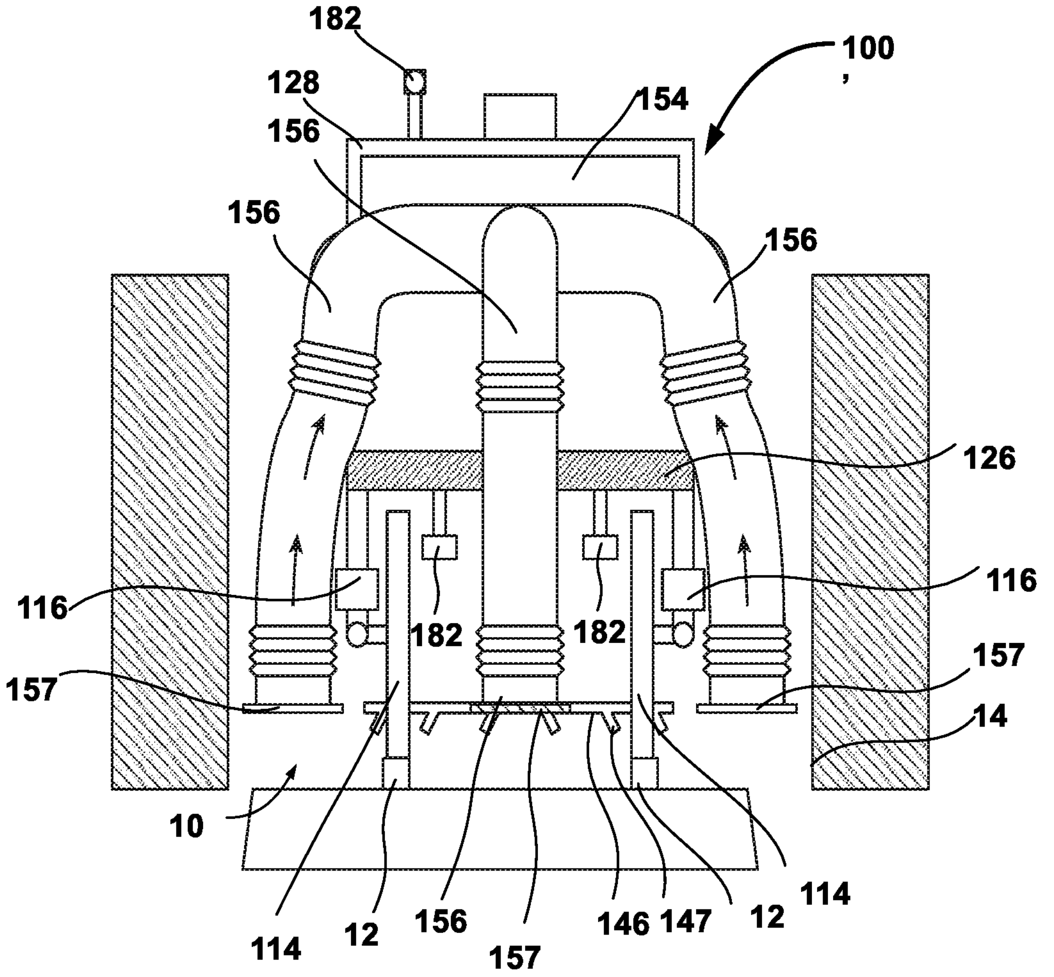
FIG. 6 illustrates a rear view of the rail track cleaner vehicle of FIG. 4.

FIGS. 4-6 illustrates a side view of a rail track cleaner vehicle 100' placed on a rail track 12 in a rail area 10, according to another embodiment of the present invention. The rail track cleaner vehicle 100' shown in FIGS. 4-6 is pretty similar to the rail track cleaner vehicle 100 shown in FIGS. 1-3 except for modifications associated with the electric power collection. The Rail track cleaner vehicle 100' comprises a wheel assembly 110, a main frame 120, a liquid sprayer assembly 130, an air blower assembly 140, a vacuum assembly 150 and an electric motor assembly 160, similar to Rail track cleaner vehicle 100 of FIGS. 1-3. The Rail track cleaner vehicle 100' comprises an electric battery 162 instead of the overhead current collector 164 which will be described below in greater detail.

As shown in FIGS. 4-6, the rail track cleaner vehicle 100' comprises an electric battery 162 for powering the electric motor assembly 160. As shown in FIGS. 4-6, the battery 162 is disposed inside the vehicle body frame 128. The electric battery 162 is electrically connected to the electric motor assembly 160. Further, the electric battery 162 is electrically connected to a battery control unit (not shown in figures). In an embodiment, the battery control unit (not shown in figures) comprises electrical circuitry to protect battery 162 from overcharging, provides charging interface for battery 162 as well as ensures safe and reliable operation of the battery 162. The Electrical battery 162 have a substantially high capacity and the electric battery 162 could have a type conventionally known in the art such as but not limited to: lead acid battery, Lithium battery, alkaline battery, molten salt battery, sodium ion battery and so on.

In an embodiment, the electric battery 162 is rechargeable such that the rail track cleaner vehicle 100' could be docked at a charging point (not shown in figures) and the electrical battery 162 could be charged at the charging point (not shown in figures). In another embodiment, the electric battery 162 is removable such that a depleted electric battery 162 could be replaced by a fully charged electric battery 162 by merely removing the depleted electric battery 162 and installing fully charged electric battery 162 in the rail track cleaner vehicle 100'.

Figure 7:
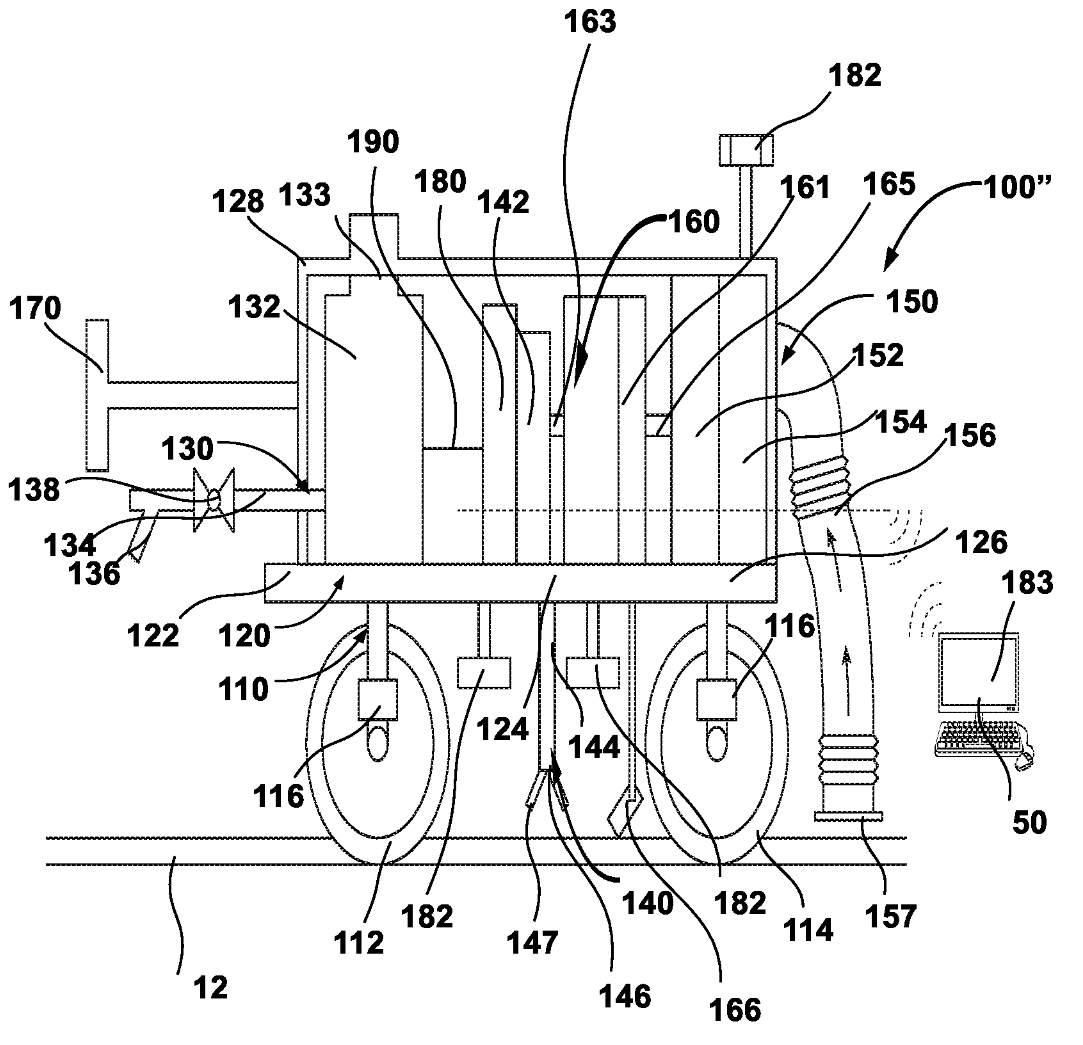
FIG. 7 illustrates a side view of a rail track cleaner vehicle placed on a rail track in a rail area, according to another embodiment of the present invention.
Figure 8:
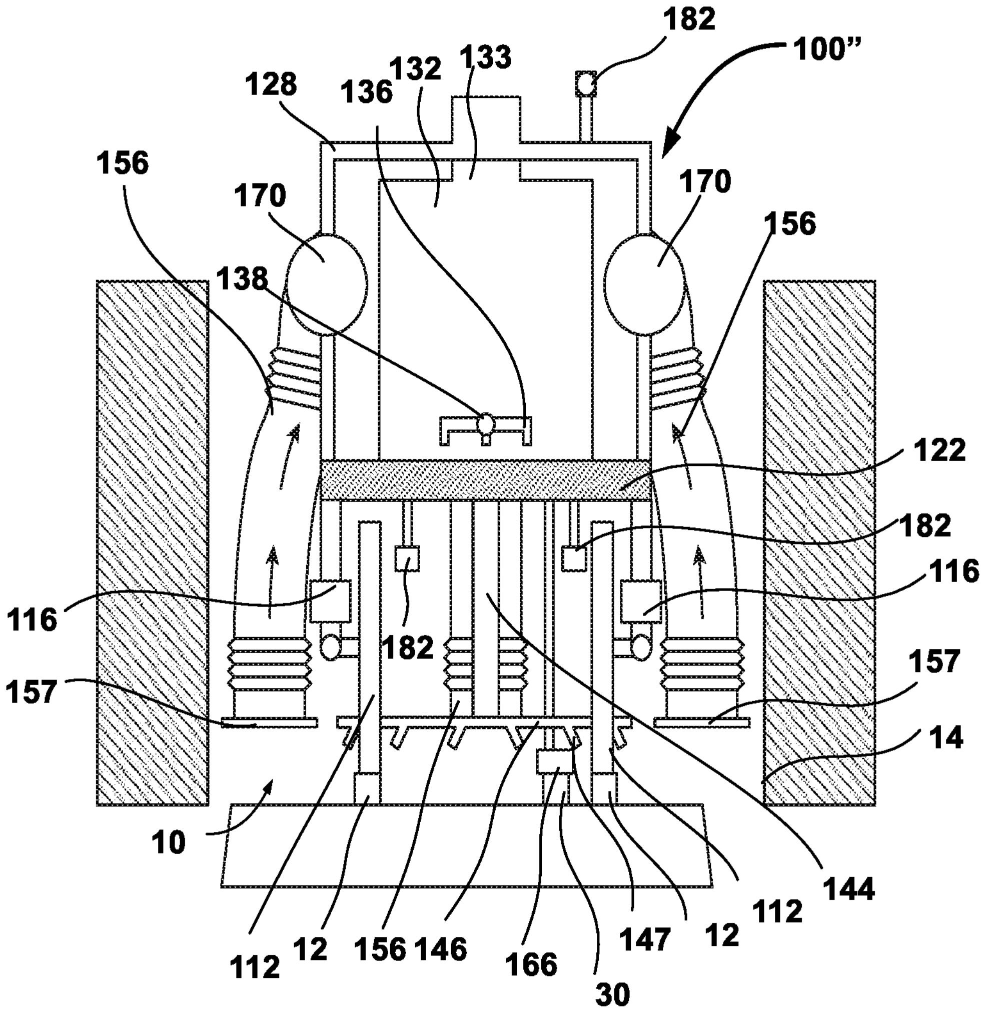
FIG. 8 illustrates a front view of the rail track cleaner vehicle of FIG. 7.
Figure 9:
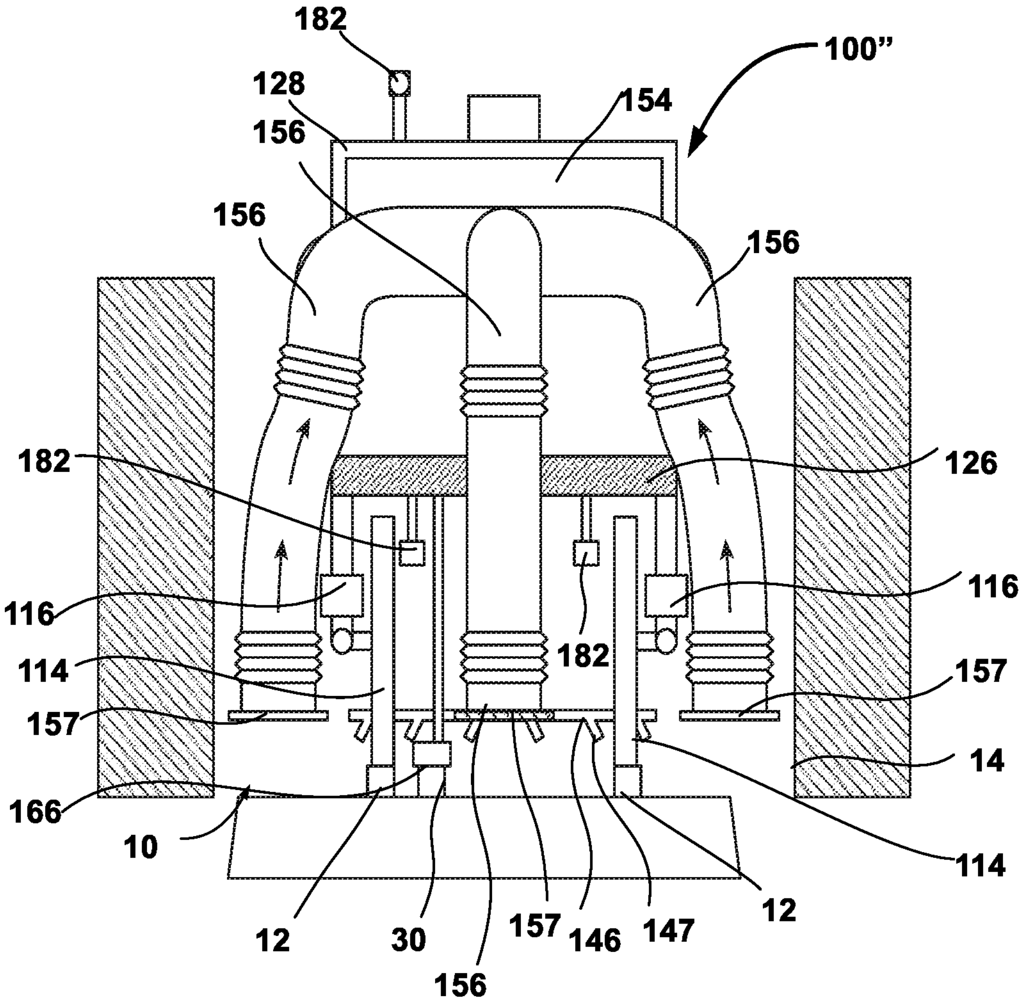
FIG. 9 illustrates a rear view of the rail track cleaner vehicle of FIG. 7.

FIGS. 7-9 illustrates a side view of a rail track cleaner vehicle 100" placed on a rail track 12 in a rail area 10, according to another embodiment of the present invention. The rail track cleaner vehicle 100" shown in FIGS. 7-9 is pretty similar to the rail track cleaner vehicle 100 shown in FIGS. 1-3 except for modifications associated with the electric power collection. The Rail track cleaner vehicle 100" comprises a wheel assembly 110, a main frame 120, a liquid sprayer assembly 130, an air blower assembly 140, a vacuum assembly 150 and an electric motor assembly 160, similar to Rail track cleaner vehicle 100 of FIGS. 1-3. The Rail track cleaner vehicle 100" comprises a bottom power collector 166 instead of the overhead current collector 164 which will be described below in greater detail.

As shown in FIGS. 7-9, the rail track cleaner vehicle 100" comprises a bottom power collector 166 to collect electric power from electric third rail 30. The electric third rail 30 could be connected to an electrical power generation source such as but not limited to: thermal power plant, hydropower plant, steam power plants and so on. The bottom power collector 166 is positioned on the underside of the rail track cleaner vehicle 100" such that the rail track cleaner vehicle 100" receives continues electric supply to power the rail track cleaner vehicle 100. As shown in FIGS. 7-9, the bottom power collector 166 is connected to the main frame 120. In an exemplary embodiment, the bottom power collector 166 supplies electric power received from electric third rail 30 to the electric motor assembly 160. Further, the rail track cleaner vehicle 100" comprises a power distribution unit (not shown in figures) that facilitates safe electrical route of current from the bottom power collector 166 to the electric motor assembly 160. The power distribution unit (not shown in figures) controls power fluctuations in the electric third rail 30. The power distribution unit (not shown in figures) could comprise electric circuitry that could include: a transformer, invertors, rectifiers, resistors, fuses and so on.

As shown in FIGS. 7-9, the bottom power collector 166 is a contact shoe. As shown in FIGS. 7-9, the bottom power collector 166 is positioned on the underside of the rail track cleaner vehicle 100" such that the bottom power collector 166 contacts the electric third rail 30. As seen in front view in FIG. 8, the bottom power collector 166 is positioned between the pair of front wheels 112 and the electric third rail 30 is positioned between the rail tracks 12. As seen in rear view in FIG. 9, the bottom power collector 166 is positioned between the pair of rear wheels 114 and the electric third rail 30 is positioned between the rail tracks 12.

In an embodiment (not shown in figures), the bottom power collector 166 is not positioned between the pair of front wheels 112 when the electric third rail 30 is positioned outside the gap of rail tracks 12. Instead, the bottom power collector 166 is positioned outside the gap between the pair of front wheels 112. This design enables the bottom power collector 166 to contact the electric third rail 30 wherein the electric third rail 30 is positioned outside the gap of rail tracks 12.

Figure 10:
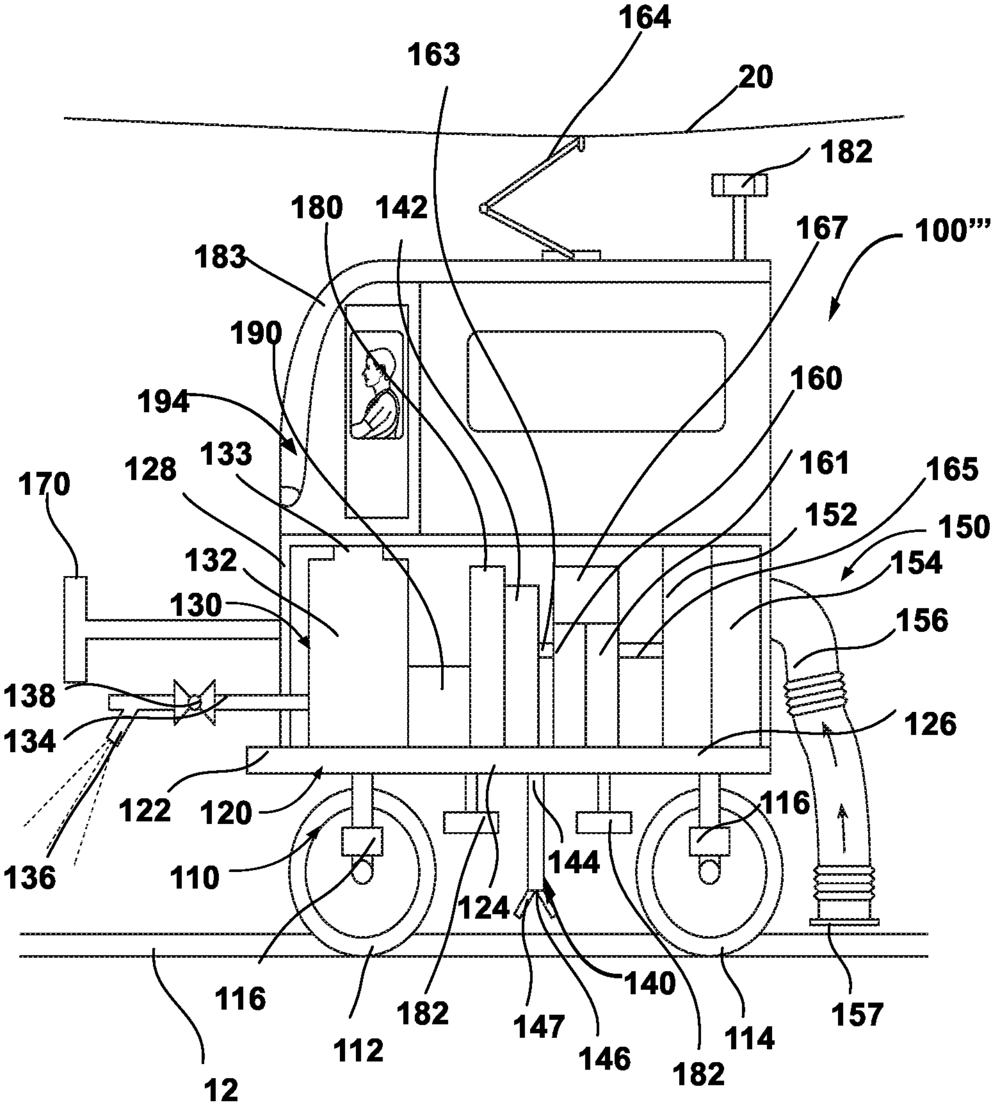
FIG. 10 illustrates a side view of a rail track cleaner vehicle comprising an operator cabin, according to yet another embodiment of the present invention.

Referring to FIG. 10, a rail track cleaner vehicle 100'" is shown wherein the rail track cleaner vehicle 100'" further comprises an operator cabin 194, according to another embodiment of the present invention. The rail track cleaner vehicle 100' shown in FIG. 10 is pretty similar to the rail track cleaner vehicle 100 shown in FIGS. 1-3 except for addition of the operator cabin 194. The Rail track cleaner vehicle 100'" comprises a wheel assembly 110, a main frame 120, a liquid sprayer assembly 130, an air blower assembly 140, a vacuum assembly 150 and an electric motor assembly 160, similar to rail track cleaner vehicle 100 of FIGS. 1-3. The operator cabin 194 comprises a vehicle control panel 195 (not shown in figures) that is electrically connected to the controller 180. The vehicle control panel 195 (not shown in figures) comprises a plurality of control switches and/or buttons that enable a human operator to manually input data in the controller 180. A human operator can operate in the operator cabin 194 and manually input data using the vehicle control panel 195 (not shown in figures) to control various units and/or assemblies electrically connected to the controller 180.

In an embodiment, a display screen 183 is installed in the operator cabin 194 such that the human operator can visually see the rail area 10 and based on the image output of the optical camera 182 in the display screen 183, he/she can efficiently clean the dirty rail area 10.

Figure 11:
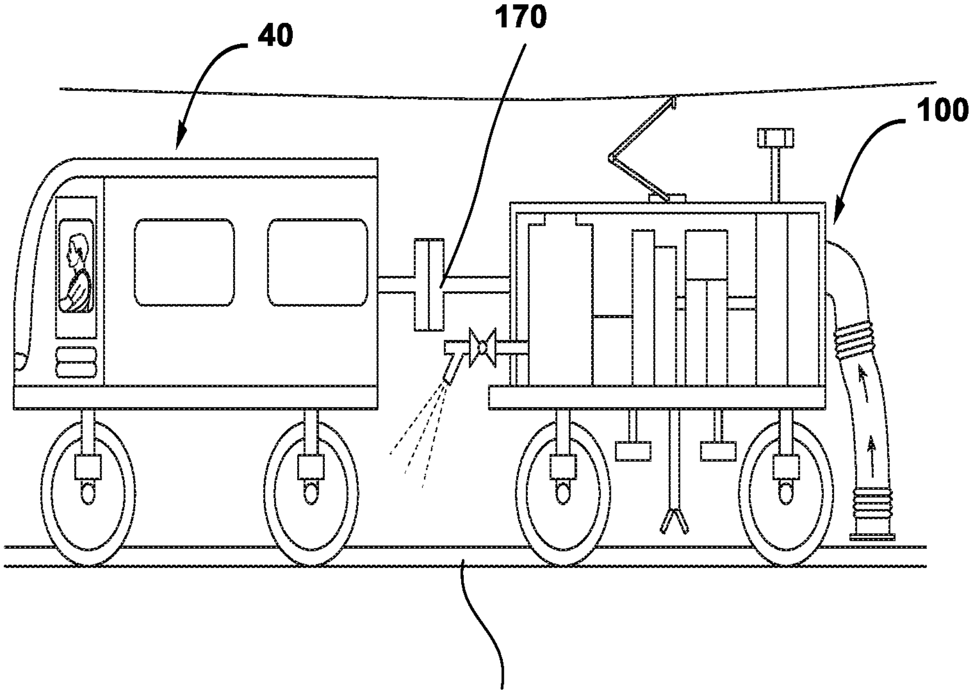
FIG. 11 illustrates a side view of a rail track cleaner vehicle coupled to a rail vehicle, according to another embodiment of the present invention.

Referring to FIG. 11, a rail track cleaner vehicle 100 coupled to a rail vehicle 40 is shown. The Rail track cleaner vehicle 100 comprises a coupling 170 to removably connect the rail track cleaner vehicle 100 with other rail vehicle 40. The coupling 170 permits safe carrying of Rail track cleaner vehicle 100 in case of power malfunction in the Rail track cleaner vehicle 100. A rail vehicle 40 such as but not limited to: train engine, Passenger car and so on could be removably coupled to the rail track cleaner vehicle 100 by connecting the coupling 170 of the rail track cleaner vehicle 100 with the rail vehicle 40.

In another embodiment, a rail vehicle 40 such as but not limited to: a passenger train is connected to the rear of the rail track cleaner vehicle 100 when the rail vehicle 40 is travelling to its destination. The rail vehicle 40 carries passenger/goods while the rail track cleaner vehicle 100 cleans the rail area 10. This configuration of the rail vehicle 40 connected to the rail track cleaner vehicle 100 permits clean travel such that the rail area 10 dirtied/polluted by the rail vehicle 40 is cleaned by the rail track cleaner vehicle 100.

Figure 12:
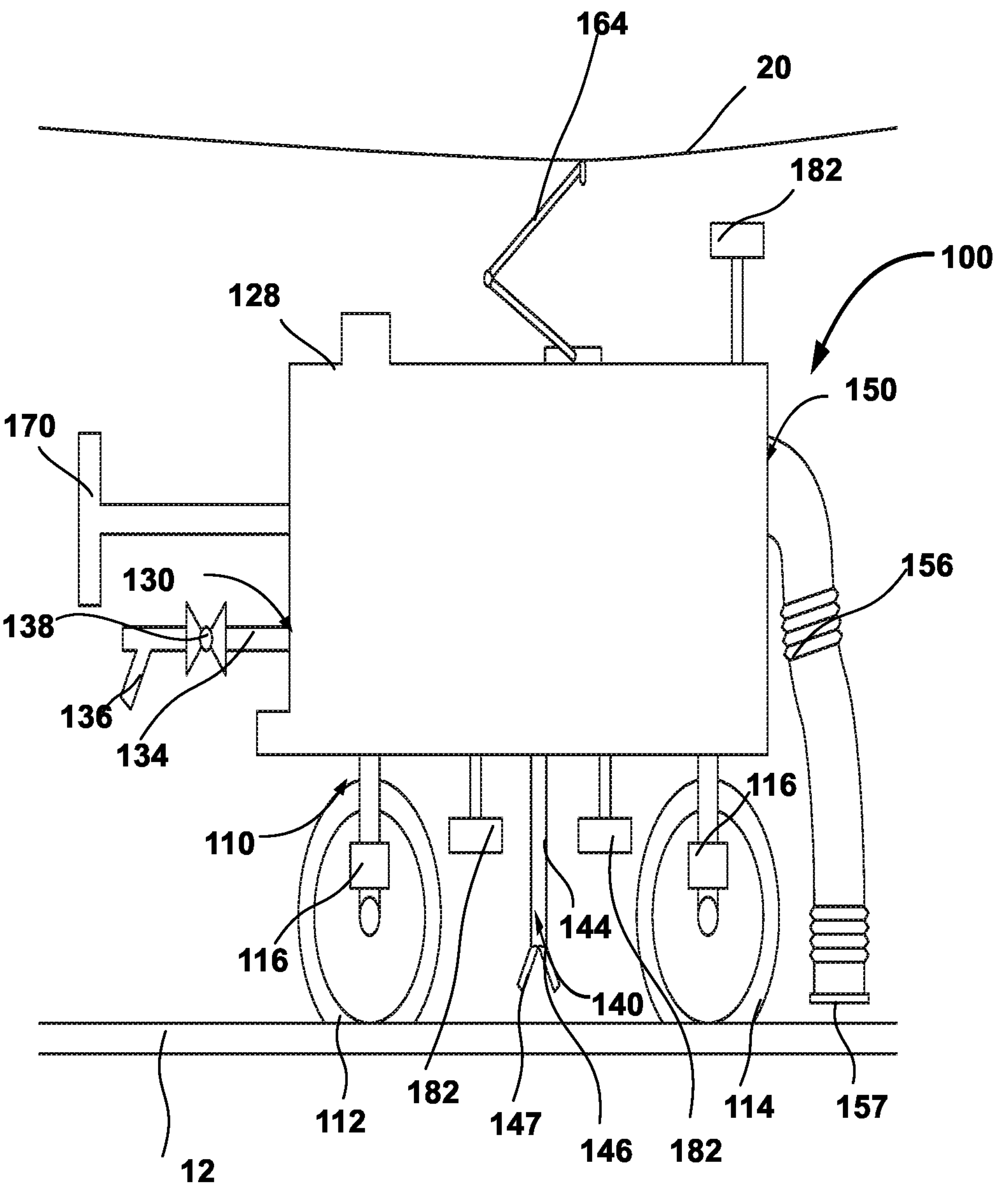
FIG. 12 illustrates a side view of a rail track cleaner vehicle wherein the rail track cleaner vehicle is concealed for aesthetic appeal, according to an embodiment of the present invention.

FIG. 12 illustrates a side view of a rail track cleaner vehicle 100 wherein the rail track cleaner vehicle 100 is concealed for aesthetic appeal and better visual display, according to an embodiment of the present invention. The vehicle body frame 128 is covered with various panels such that the various assemblies and/or parts of the rail track cleaner vehicle 100 are not visible directly to public eye. To perform maintenance and repair of the various assemblies and/or parts of the rail track cleaner vehicle 100, various panels are removed from the vehicle body frame 128. Further, in various embodiments, design features such as but not limited to: paint, advertisement, art-work, pictures, designs and so on could be added to the multiple panels for better aesthetic appeal.

An exemplary method of cleaning a rail area 10 will now be described in detail with reference to FIG. 1-12. Firstly, a liquid is sprayed in the rail area. The liquid is sprayed by the liquid sprayer assembly 130. Afterwards, by using pressurized air, the trash on the rail track 12 is pushed to the edge of the platform 14. The pressurized air is provided by the air blower assembly 140. Afterwards, the trash from the edge of the platform 14 is collected in a trash collector bin 154 by using vacuum effect. The vacuum effect is provided by the vacuum assembly 150.

It should be understood that the term "rail area" 10 is a broad term and it comprises rail track 12 and the surroundings close to the rail track 12. In an embodiment, the "rail area" could be the distance between the edges of the platform 14. It should be understood that the term "rail vehicle" 40 is a broad term and it comprises any vehicle capable of running on the rail track 12. The rail vehicle 40 could include but not limited to: freight train, high speed trains, diesel locomotive unit, railcar, tank locomotive, MAGLEV trains, aero train, passenger train, steam locomotive and so on. Further, it should be understood that the rail track cleaner vehicle (100, 100', 100", 100'") is configured to clean a rail area 12 wherein the rail area 12 could be any passage that is suited for travel of a rail vehicle such as but not limited to: railway platform, metro train platform, subway train passage, railway path between two stations, railway vehicle loading area, railway vehicle unloading area, railway vehicle maintenance and inspection area and so on.

It should be understood that the rail track cleaner vehicle (100, 100', 100", 100'") does not necessarily require edges of the platform 14 for collecting trash in the trash collector bin 154. Broadly speaking, the rail track cleaner vehicle (100, 100', 100", 100'") could effectively and efficiently function in rail areas that does not have platform edges i.e. open rail areas with little to no variation.

It should be understood that the rail track cleaner vehicle (100, 100', 100", 100'") does not necessarily require edges of the platform 14 for collecting trash in the trash collector bin 154. Broadly speaking, the rail track cleaner vehicle (100, 100', 100", 100'") could effectively and efficiently function in rail areas that does not have platform edges i.e. open rail areas with little to no variation.

The rail track cleaner vehicle (100, 100', 100", 100'") of the present invention including various components, parts thereof may be configured in many different shapes, sizes and using different kinds of materials, including but not limited to metals, plastics, ceramics, composites, polymers, rubber, silicone and one should not construed these aspects to be a limiting factor for the invention disclosed herein.

It should be understood that the various components and assemblies of the various embodiments of rail track cleaner vehicle (100, 100', 100", 100'") of the present invention are similar and interchangeable. It is obvious to the one skilled in the art that the various components and assemblies of the rail track cleaner vehicle (100, 100', 100", 100'") of one embodiment of the present invention could be considered for other embodiments with little or no variation.

It should be understood according to the preceding description of the present invention that the same is susceptible to changes, modifications and adaptations, and that the said changes, modifications and adaptations fall within scope of the appended claims.

What is claimed is:

1. A rail track cleaner vehicle (100) configured for cleaning rail area (10) comprising:

a wheel assembly (110) comprising a pair of front wheels (112) and a pair of rear wheels (114) longitudinally spaced from one another, wherein the wheel assembly (110) comprises a wheel adjusting subassembly (116) for adjusting ground clearance of the rail track cleaner vehicle (100);

a main frame (120) connected to wheel assembly (110) wherein the frame element comprises a first frame (122), a second frame (124) and a third frame (126);

a liquid sprayer assembly (130) positioned on top of the first frame (122) wherein the liquid sprayer assembly (130) comprises a liquid storage tank (132), a spray pipe (134) and at least one spray nozzle (136);

an air blower assembly (140) positioned on top of the second frame (124) wherein the air blower assembly (140) comprises a compressor (142), at least one air duct (144) and an air outlet portion (146);

a vacuum assembly (150) positioned on top of the third frame (126) wherein the vacuum assembly (150) comprises a vacuum pump (152), a trash collector bin (154) and at least one vacuum hose (156); and an electric motor assembly (160) positioned on the main frame (120) for propelling the air blower assembly (140) and the vacuum assembly (150).

2. The rail track cleaner vehicle (100) according to claim 1, wherein the Rail track cleaner vehicle (100) comprises an electric battery (162) for powering the electric motor assembly (160).

3. The rail track cleaner vehicle (100) according to claim 1, wherein the Rail track cleaner vehicle (100) comprises an overhead current collector (164) to collect power from overhead lines (20).

4. The rail track cleaner vehicle (100) according to claim 1, wherein the rail track cleaner vehicle (100) comprises a bottom power collector (166) to collect power from electric third rail (30).

5. The rail track cleaner vehicle (100) according to claim 1, wherein the rail track cleaner vehicle (100) comprises a coupling (170) to removably connect the rail track cleaner vehicle (100) with other rail vehicle (40).

6. The rail track cleaner vehicle (100) according to claim 1, wherein the rail track cleaner vehicle (100) comprises a wireless communication module (190) for enabling wireless connection to a remote device (50).

7. The rail track cleaner vehicle (100) according to claim 1, wherein the rail track cleaner vehicle (100) comprises at least one optical camera (182).

8. The rail track cleaner vehicle (100) according to claim 1, wherein the rail track cleaner vehicle (100) comprises a vehicle controller (180) to control various operational parameters of the rail track cleaner vehicle (100).

9. The rail track cleaner vehicle (100) according to claim 1, wherein the rail track cleaner vehicle (100) comprises an operator cabin (194) to control various operational parameters of the rail track cleaner vehicle (100).

10. The rail track cleaner vehicle (100) according to claim 1, wherein the liquid sprayer assembly (130) comprises a flow control element (138).

11. A method of cleaning rail area (10) using a rail track cleaner vehicle according to claim 1, comprising the steps of: spraying a liquid in the rail area (10); pushing the trash from the rail track (12) to the edge of the platform (14) by using pressurized air; and collecting the trash from the edge of the platform (14) in a trash collector bin (154) by using vacuum.

* * * * *